United States Patent [19]

Kawabe

[11] Patent Number: 5,656,775
[45] Date of Patent: Aug. 12, 1997

[54] DEVICE FOR INSTALLING A TIRE-WHEEL ASSEMBLY ONTO A WHEEL BALANCER

[75] Inventor: Hiroshi Kawabe, Kodaita, Japan

[73] Assignee: Bridgestone Corporation, Tokyo, Japan

[21] Appl. No.: 572,577

[22] Filed: Dec. 14, 1995

Related U.S. Application Data

[63] Continuation of Ser. No. 325,514, Oct. 19, 1994, abandoned.

[30] Foreign Application Priority Data

Oct. 22, 1993 [JP] Japan .................. 5-057232

[51] Int. Cl.$^6$ .................. G01M 1/04; G01M 1/06
[52] U.S. Cl. .................. 73/487; 73/484; 157/14
[58] Field of Search .................. 73/487, 484, 485; 157/16, 14, 17, 21

[56] References Cited

U.S. PATENT DOCUMENTS

| | | |
|---|---|---|
| 2,955,829 | 10/1960 | Brewster et al. . |
| 3,349,626 | 10/1967 | Palacios .................. 73/487 |
| 3,824,862 | 7/1974 | Branick .................. 73/487 |
| 3,888,128 | 6/1975 | Mitchell .................. 73/487 |
| 4,168,627 | 9/1979 | Held et al. .................. 73/487 |
| 4,423,633 | 1/1984 | Coetsier .................. 73/487 |
| 4,462,253 | 7/1984 | Becher .................. 73/487 |
| 4,478,081 | 10/1984 | Greene .................. 73/487 |
| 4,489,608 | 12/1984 | Burner .................. 73/487 |
| 5,312,118 | 5/1994 | Wakotsch .................. 73/487 |
| 5,347,866 | 9/1994 | Maurer .................. 73/487 |
| 5,385,045 | 1/1995 | Mannen et al. .................. 73/487 |

FOREIGN PATENT DOCUMENTS

| | | |
|---|---|---|
| 56-2173 | 1/1981 | Japan . |
| 56-47553 | 11/1981 | Japan . |
| 56-48054 | 11/1981 | Japan . |
| 57-20567 | 4/1982 | Japan . |
| 57-39781 | 9/1982 | Japan . |
| 4131744 | 12/1992 | Japan . |

Primary Examiner—Hezron E. Williams
Assistant Examiner—Helen C. Kwok
Attorney, Agent, or Firm—Sughrue, Mion, Zinn, Macpeak & Seas

[57] ABSTRACT

A device for installing a tire-wheel assembly onto a wheel balancer comprises a rotating shaft of the wheel balancer for rotating the tire-wheel assembly, a wheel receiving member comprised of a disc-contacting portion and a cup-shaped base portion, a taper cone of a frustoconical shape, a spring disposed between a bottom of the cup-shaped base portion and a bottom of the taper cone, a wheel pushing member, and a female screw member, in which the disc-contacting portion of the wheel receiving member is provided at a side facing the disc portion with an elastic member embedded in the disc-contacting portion in a peripheral direction thereof and a protruding member contacting with the elastic member and retractably moving from an outer surface of the disc-contacting portion in an axial direction thereof.

9 Claims, 6 Drawing Sheets

FIG_1
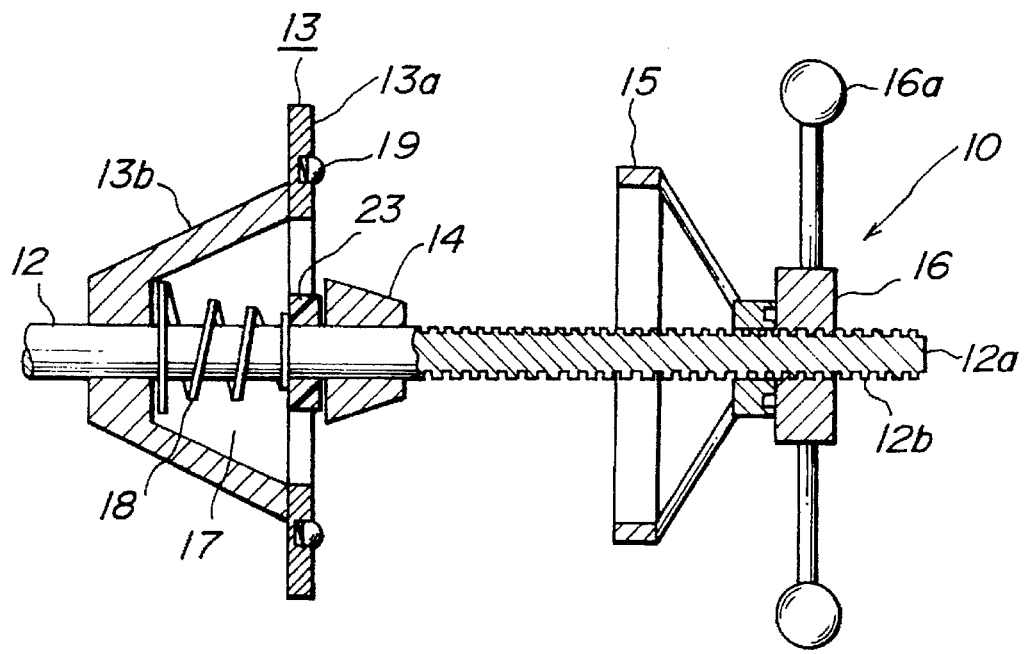
FIG_2
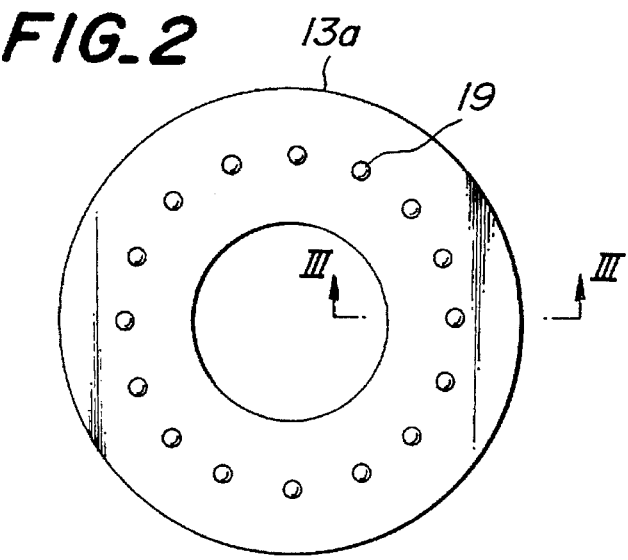
FIG_3
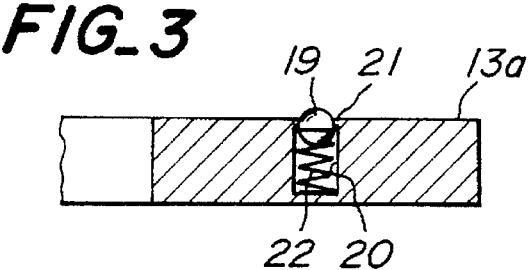

FIG_4
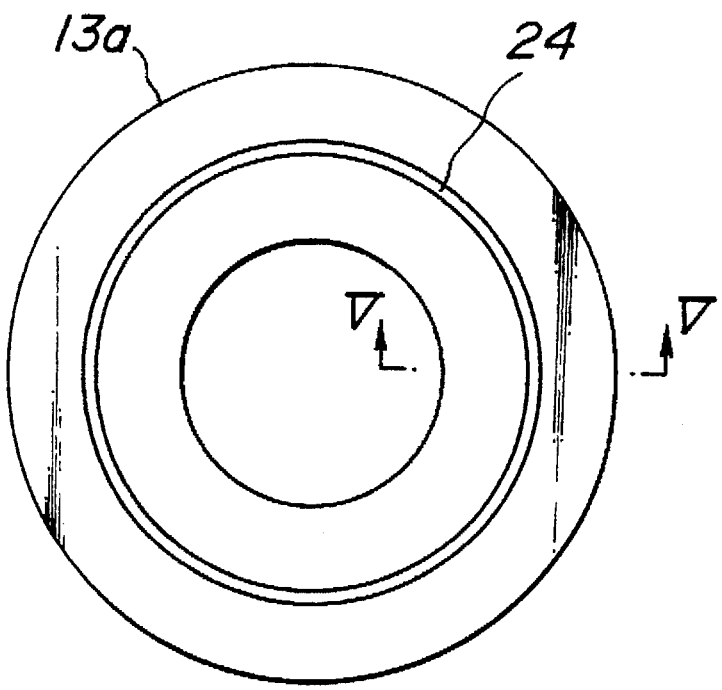
FIG_5
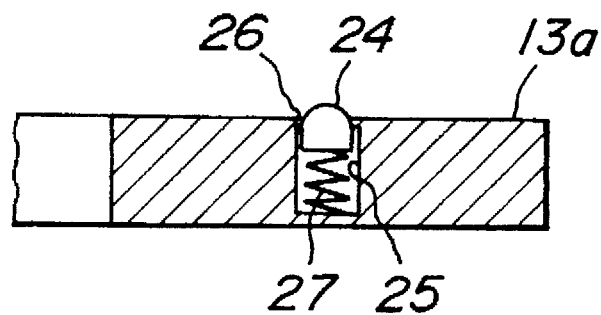

FIG_7
PRIOR ART
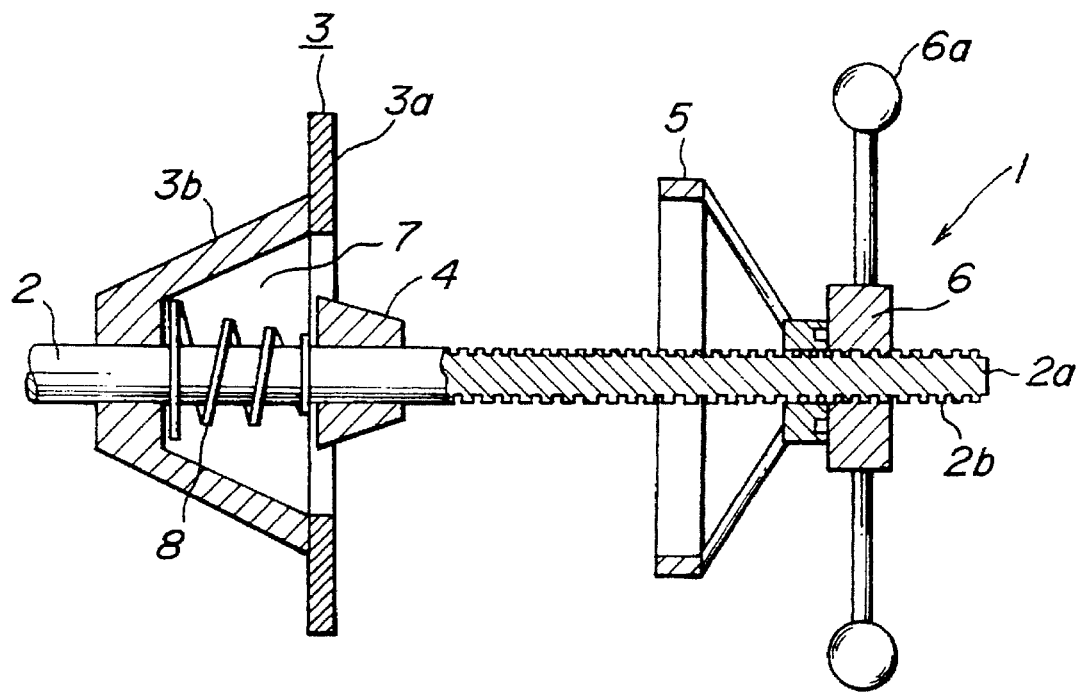
FIG_8a
PRIOR ART
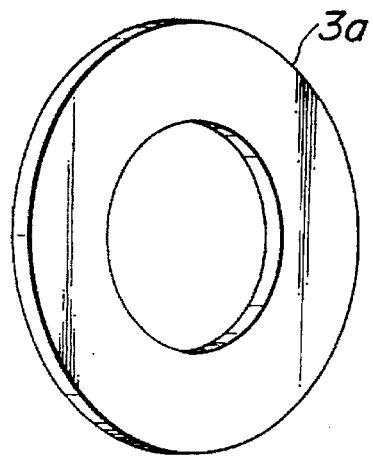
FIG_8b
PRIOR ART
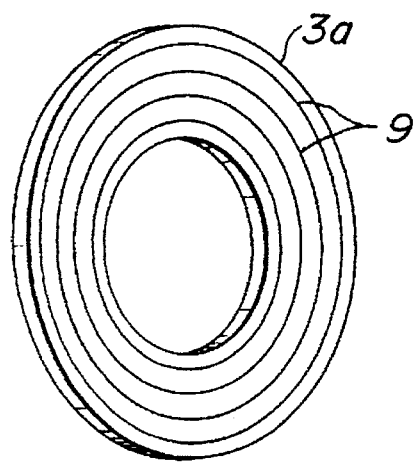

FIG_10a
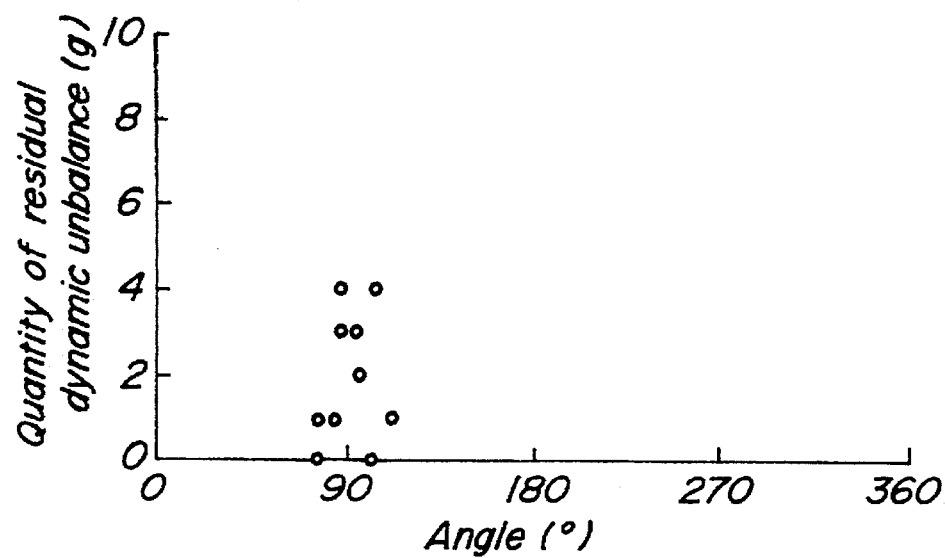
FIG_10b
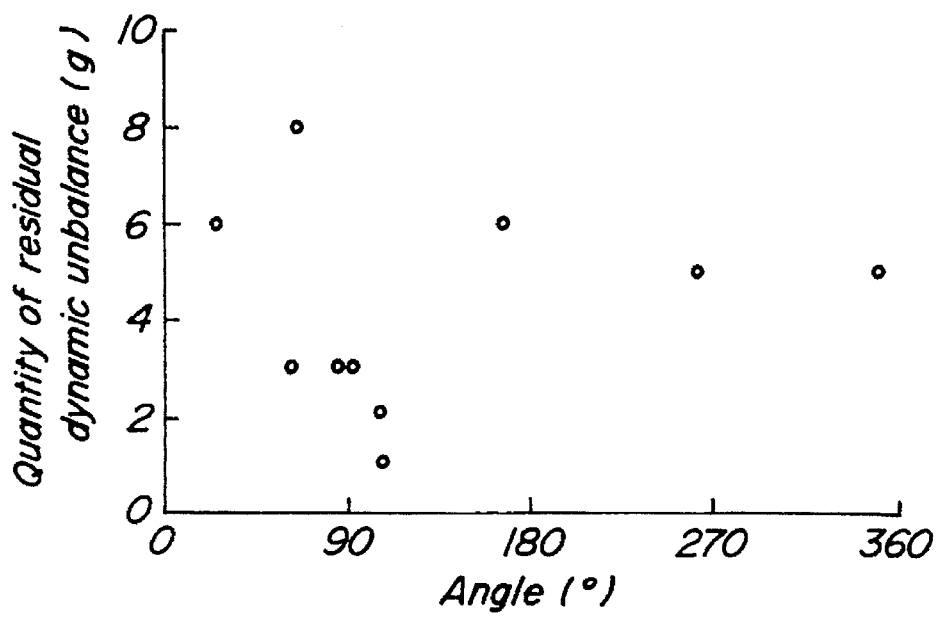

ND A TIRE-WHEEL
DEVICE FOR INSTALLING A TIRE-WHEEL ASSEMBLY ONTO A WHEEL BALANCER

This is a continuation of application Ser. No. 08/325,514, filed Oct. 19, 1994 now abandoned.

BACKGROUND OF THE INVENTION

1. Field of the Invention

This invention relates to a device for installing a tire-wheel assembly onto a wheel balancer for measuring and correcting a rotating unbalance of the tire-wheel assembly.

2. Description of the Related Art

As shown in FIG. 7, the conventional device 1 for installing a tire-wheel assembly onto a wheel balancer comprises a wheel receiving member 3, a tapered cone 4 of a frustoconical shape, a wheel pushing member of a frustoconical shape and a female screw member 6, which are concentrically attached to a rotating shaft 2 extending from a main body of a wheel balancer (not shown). The wheel receiving member 3 is constructed by integrally uniting a disc-contacting portion 3a with a cup-shaped base portion 3b, in which a bottom of the base portion 3b is concentrically fixed to the rotating shaft 2 passing therethrough and the disc-contacting portion 3a extends outward from the base portion 3b in a direction perpendicular to the rotating shaft 2. Moreover, the disc-contacting portion 3a has a smooth metal surface as shown in FIG. 8a or is provided at its smooth surface with a plurality of fine and shallow circular grooves 9 as shown in FIG. 8b. A coil-shaped spring 8 is disposed in a cavity 7 of the wheel receiving member 3 between the bottom of the base portion 3b and the tapered cone 4. The tapered cone 4 is slidably moved on the rotating shaft 2 inside the wheel receiving member 3 when a pushing force is applied to the tapered cone 4 from a right side in FIG. 7.

After a disc portion of a tire-wheel assembly (not shown) is mounted onto the wheel receiving member 3, the wheel pushing member 5 is slidably loaded on the rotating shaft 2 from a top 2a thereof and moved toward the wheel receiving member 3 by the female screw member 6 engaging with male threads formed on the outer surface of the rotating shaft 2 over a given region ranging from the top 2a in the longitudinal direction through a handle portion 6a attached to the female screw member 6 to fix the disc portion between the wheel receiving member 3 and the wheel pushing member 5.

Thus, the tire-wheel assembly is mounted onto the installing device 1 in which the rotating shaft 2 is projected sideways from the balancing body of the wheel balancer. In this case, the disc portion of the wheel is first contacted with the tapered cone 4 at a position corresponding to a center hole of the disc portion by pushing the disc portion of the wheel toward the wheel receiving member 3 through the wheel pushing member 5 and the female screw member 6. At this stage, the tire-wheel assembly takes an unstable posture against the installing device because the position of center of gravity in the axial direction of the tire-wheel assembly is usually offset toward a front side of the. Also the tire-wheel assembly is biased downward against the rotating shaft 2 due to the fact that the inclined outer surface of the tapered cone 4 is downward to the right.

As the pushing force is applied to the disc portion from the front side of the tire-wheel assembly by moving the wheel pushing member 5 while manipulating the handle 6a of the female screw member 6, the inner peripheral face of the center hole of the disc portion slides on the inclined surface of the tapered cone 4, whereby the disc portion of the tire-wheel assembly is stopped at an adequate position on the inclined surface of the tapered cone 4. When the pushing force is further applied to the disc portion through the female screw member 6, the spring 8 is compressed on the rotating shaft 2 toward the bottom of the base portion 3b to closely adhere the back surface of the disc portion to the disc-contacting portion 3a of the wheel receiving member 3, whereby the mounting of the tire-wheel assembly onto the installing device 1 is completed.

After mounting of the tire-wheel assembly onto the installing device 1, any unbalance of the tire-wheel assembly is measured by actuating the wheel balancer and a balancing weight is attached to a balancing position of the wheel indicated by the balancer to correct the unbalance to zero. When such a corrected tire-wheel assembly is detached from the installing device 1 and again mounted onto the installing device in the same manner as described above, the unbalance appears and the unbalacing quantity of about 10–20 g (grams) frequently measured.

As a result of various investigations on a cause of poor reproducibility in the measurement of unbalance and correction thereof, the following has been confirmed. That is, when the tire-wheel assembly is mounted onto the installing device 1, it rides on the tapered cone 4 at the unstable posture as previously mentioned. When the tire-wheel assembly is pushed toward the wheel receiving member 3 through the wheel pushing member 5 and female screw member 6 at such a state, the inner peripheral face of the center hole in the disc portion is located on the tapered cone 4 at a somewhat inclined state with respect to a plane perpendicular to the axis of the tapered cone 4, or a part of the rear surface of the disc portion facing the wheel receiving member 3 is contacted with the disc-contacting portion 3a of the wheel receiving member 3 to complete the mounting of the tire-wheel assembly. That is, it has been confirmed that the remaining part of the rear surface of the disc portion located opposite by 180° to the part closely contacting with the disc-contacting portion 3a is at a floating state separated from the disc-contacting portion 3a. Such a slant mounting of the tire-wheel assembly with respect to the installing device 1 results in dynamic unbalance, while the mounting at a biased state results in static unbalance, which degrade naturally the reproducibility of the aforementioned unbalance correction.

SUMMARY OF THE INVENTION

It is, therefore, an object of the invention to provide a device for installing a tire-wheel assembly onto a wheel balancer capable of advantageously solving the aforementioned problems of the conventional technique.

According to the invention, there is the provision of in a device for installing a tire-wheel assembly onto a wheel balancer comprising a rotating shaft of the wheel balancer for rotating the tire-wheel assembly, a wheel receiving member concentrically fixed to the rotating shaft and comprised of a disc-contacting portion and a cup-shaped base portion, a tapered cone of a frustoconical shape concentrically and slidably attached onto the rotating shaft in the vicinity of the wheel receiving member and fitting in a center hole of a disc portion of the tire-wheel assembly, a spring disposed between a bottom of the cup-shaped base portion and a bottom of the tapered cone for moving the tapered cone toward a free end of the rotating shaft, a wheel pushing member for moving the disc portion of the tire-wheel assembly toward the wheel receiving member, and a female screw member movably engaging with male threads formed on an outer surface of the rotating shaft over a given region from the free end thereof, the improvement wherein the disc-contacting portion of the wheel receiving member is provided at a side facing the disc portion with an elastic member embedded in the disc-contacting portion in a peripheral direction thereof and a protruding member contacting with the elastic member and retractably moving from an outer surface of the disc-contacting portion in an axial direction thereof.

In a preferred embodiment of the invention, a plurality of holes are formed in the disc-contacting portion of the wheel receiving member at a given interval in the peripheral direction thereof and the elastic member and the protruding member are disposed in each of the holes.

In another preferred embodiment of the invention, an annular groove is formed in the disc-contacting portion of the wheel receiving member in the peripheral direction thereof and one or more elastic members and an annular protruding member are disposed in the annular groove.

In the other preferred embodiment of the invention, a sliding member for reducing friction in radial direction is concentrically arranged between the taper cone and the spring with respect to the rotating shaft.

BRIEF DESCRIPTION OF THE DRAWINGS

The invention will be described with reference to the accompanying drawings, wherein:

FIG. 1 is a diagrammatically sectional view of a device for installing a tire-wheel assembly onto a wheel balancer according to the invention;

FIG. 2 is a plan view of a first embodiment of the wheel receiving member used in the invention;

FIG. 3 is a section view taken along a line III—III of FIG. 2;

FIG. 4 is a plan view of a second embodiment of the wheel receiving member used in the invention;

FIG. 5 is a section view taken along a line V—V of FIG. 4;

FIG. 7 is a diagrammatically sectional view of the conventional device for installing a tire-wheel assembly onto a wheel balancer;

FIGS. 8a and 8b are plan views of the wheel receiving member used in the conventional device, respectively;

FIGS. 10a–10b are graphs showing a relation between quantity and angle of residual dynamic unbalance.

DESCRIPTION OF THE PREFERRED EMBODIMENTS

Figure 6A:
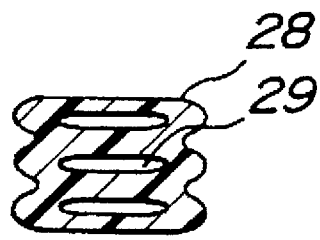
FIGS. 6a–6c are schematic views of various elastic members used in the wheel receiving member according to the invention, respectively.

According to the invention, the disc-contacting portion of the wheel receiving member is provided at a side facing the disc portion with the elastic member embedded in the disc-contacting portion in the peripheral direction thereof and the protruding member contacting with the elastic member and retractably moving from the outer surface of the disc-contacting portion in the axial direction thereof. When the tire-wheel assembly is mounted on the installing device, even if a part of the rear surface of the disc portion in the tire-wheel assembly contacts with the disc-contacting portion of the wheel receiving member, as the wheel pushing member is pushed to the disc portion through the female screw member, a first contact region of the rear surface of the disc portion with the top of the protruding member slides in the radial direction of the tire-wheel assembly without stopping at the contact region. The protruding member escapes in the axial direction thereof by the compression of the elastic member. As a result, the motion of the tire-wheel assembly in the axial direction thereof is smooth and substantially uniform to uniformly push the disc portion onto the periphery of the disc-contacting portion of the wheel receiving member, whereby the tire-wheel assembly can accurately be mounted onto the installing device.

FIGS. 1–3 illustrate a first embodiment of the device for installing the tire-wheel assembly onto the wheel balancer according to the invention. This installing device 10 comprises a wheel receiving member 13, a tapered cone 14 of a frustoconical shape, a wheel pushing member 15 of frustoconical shape a female screw member 16, and a handle 16a which are concentrically attached to a rotating shaft 12 extending from a main body of a wheel balancer (not shown) likewise the conventional installing device shown in FIG. 7. The wheel receiving member 13 is constructed by integrally uniting a disc-contacting portion 13a with a cup-shaped base portion 13b, in which a bottom of the base portion 13b is concentrically fixed to the rotating shaft 12 passing therethrough and the disc-contacting portion 13a extends outward from the base portion 13b in a direction perpendicular to the rotating shaft 12. A coil-shaped spring 18 is disposed in a cavity 17 of the wheel receiving member 13 between the bottom of the base portion 13b and the tapered cone 14. The tapered cone 14 is slidably moved on the rotating shaft 12 inside the wheel receiving member 13 when a pushing force is applied to the tapered cone 14 from a right side in FIG. 1.

In the wheel receiving member 13 according to the invention, the disc-contacting portion 13a is provided with a plurality of protruding members 19 arranged at a proper position in the radial direction and at a given interval in the peripheral direction as shown in FIG. 2. In this embodiment, sixteen protruding members 19 are arranged in approximately widthwise center of the disc-contacting portion 13a at an equal interval in the peripheral direction thereof. Preferably, the position of the protruding member 19 is within a range of from 10% outward with respect to a position of a middle radius of the disc-contacting portion 13a in the radial direction to 20% inward with respect to the position of the middle radius. As shown in FIG. 3, the protruding member 19 is a sphere made from a metal, a synthetic resin or the like having a diameter larger than an inner diameter of a constricted portion 21 of a hole 20 formed in the disc-contacting portion 13a and is biased by a coil spring 22 as an elastic member housed in the hole 20 to protrude outward from the outer surface of the disc-contacting portion 13a. The protrusion distance of the protruding member 19 from the outer surface of the disc-contacting portion 13a in the axial direction thereof is about 1.5 mm. In the arrangement of the protruding member, a bottom portion of the hole 20 is rendered into a cover having threads therearound (not shown), whereby the protruding member 19 can simply be disposed in the hole 20 from a rear side of the disc-contacting portion 13a.

In FIG. 1, numeral 23 is a sliding member for reducing friction in radial direction between the tapered cone 14 and the spring 18 and may be made of various thrust bearings, a Teflon-coated disc plate or the like.

FIGS. 4 and 5 illustrate a second embodiment of the wheel receiving member according to the invention. In this embodiment, the protruding member 24 is a semi-cylindrical annular protruding body. In the arrangement of the annular protruding body 24, an annular groove 25 having a constricted portion 26 is first formed in the disc-contacting portion 13a of the wheel receiving member 13. The annular protruding body 24 is disposed in the annular groove 25 from the rear side of the disc-contacting portion 13a and plural coil springs 27 as an elastic member are disposed in the annular groove 26 at proper positions in the peripheral direction between the annular protruding body and a bottom portion of the annular groove as a cover. Moreover, the annular protruding body 24 is subjected to a Teflon coating, whereby a portion of the annular protruding body 24 protruding from the constricted portion 26 may smoothly be slided to the rear surface of the disc portion of the tire-wheel assembly.

Figure 6B:
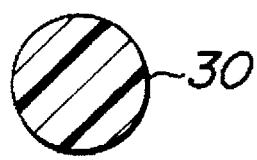
Figure 6C:
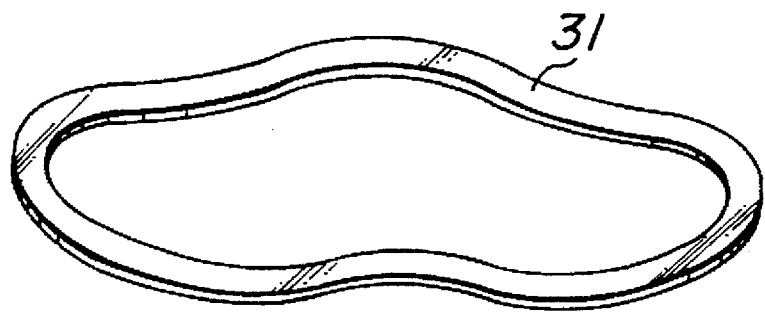

FIGS. 6a–6c show modified embodiments of the elastic member disposed between the semicylindrical annular protruding body 24 and the bottom of the annular groove 26, respectively. The elastic member shown in FIG. 6a is a ring body 28 of a rubbery elastic material having plural cavities 29 (3 cavities in this embodiment) therein in the thickness direction as shown by a sectional view. The elastic member shown in FIG. 6b is a ring body 30 of a rubbery elastic material having a circular shape in section. The elastic member shown in FIG. 6c is an annular metal plate 31 having regular undulations in the peripheral direction thereof as shown by a perspective view. These elastic members 28, 30, 31 may be disposed in the annular groove 26 instead of the coil spring. In this case, they are desirable to have a spring constant of about 1–2 kg/mm because the protruding member is pushed inward from the outer surface of the disc-contacting portion by the contraction of the elastic member at a state of mounting the tire-wheel assembly onto the installing device.

In order to confirm the effect of the installing device according to the invention, comparison test between the installing device shown in FIG. 1 and the conventional installing device shown in FIG. 7 is carried out as follows.

A passenger car tire having a tire size of 185/65 R14 is mounted onto an aluminum wheel of 6J and inflated under a internal service pressure, which is mounted onto each of the above installing devices and rotated to measure dynamic unbalance appeared in both edge portions of the tire-wheel assembly in the axial direction thereof. In the measurement of position, a position of an air valve of the tire is 0° and a measuring position is represented by a clockwise angle from the position of the air valve. Then, the quantity and angle position are calculated from the dynamic unbalance appearing in both edge portions according to vector synthesis, and a balancing weight (in grams gf) is fixed to a position of the wheel opposite by 180°, to the calculated angle position or a balancing position indicated by the balancer. After such a correction of static unbalance, the tire-wheel assembly is again rotated to measure quantity and angle position of residual dynamic unbalance, from which a balancing position indicated by the balancer is measured and a balancing weight (in grams og) is fixed thereto in the same manner as mentioned above. Thus, the tire-wheel assembly is balanced.

However, the rotating axial center of the installing device is delicately shifted from the rotating axial center of the tire-wheel assembly, so that the balancing is in fact incomplete. Once the balanced tire-wheel assembly is detached from the installing device, it is again mounted onto the installing device to conduct the measurement and correction of static unbalance and the measurement and correction of residual dynamic unbalance in the same manner as described above. Such a test is repeated 10 times. Table 1 shows results measured by using the installing device according to the invention, and Table 2 shows results measured by using the conventional installing device.

TABLE 1

|  | Static unbalance | | Dynamic unbalance | |
| --- | --- | --- | --- | --- |
|  | quantity (g) | angle (°C.) | quantity (g) | angle (°C.) |
| 1 | 2 | 37 | 1 | 83 |
| 2 | 1 | 50 | 3 | 90 |
| 3 | 2 | 45 | 3 | 93 |
| 4 | 2 | 52 | 0 | 101 |
| 5 | 0 | 20 | 1 | 78 |
| 6 | 0 | 25 | 0 | 75 |
| 7 | 3 | 41 | 4 | 88 |
| 8 | 1 | 46 | 2 | 96 |
| 9 | 0 | 60 | 4 | 105 |
| 10 | 2 | 54 | 1 | 112 |
| average | 1.3 | 45.8 | 1.8 | 86.0 |

TABLE 2

|  | Static unbalance | | Dynamic unbalance | |
| --- | --- | --- | --- | --- |
|  | quantity (g) | angle (°C.) | quantity (g) | angle (°C.) |
| 1 | 5 | 51 | 3 | 60 |
| 2 | 7 | 15 | 5 | 350 |
| 3 | 2 | 90 | 3 | 88 |
| 4 | 6 | 38 | 1 | 106 |
| 5 | 11 | 59 | 3 | 85 |
| 6 | 3 | 80 | 6 | 25 |
| 7 | 5 | 55 | 8 | 63 |
| 8 | 4 | 90 | 5 | 262 |
| 9 | 8 | 60 | 6 | 165 |
| 10 | 6 | 39 | 2 | 105 |
| average | 5.3 | 52.8 | 1.9 | 63.1 |

Figure 9A:
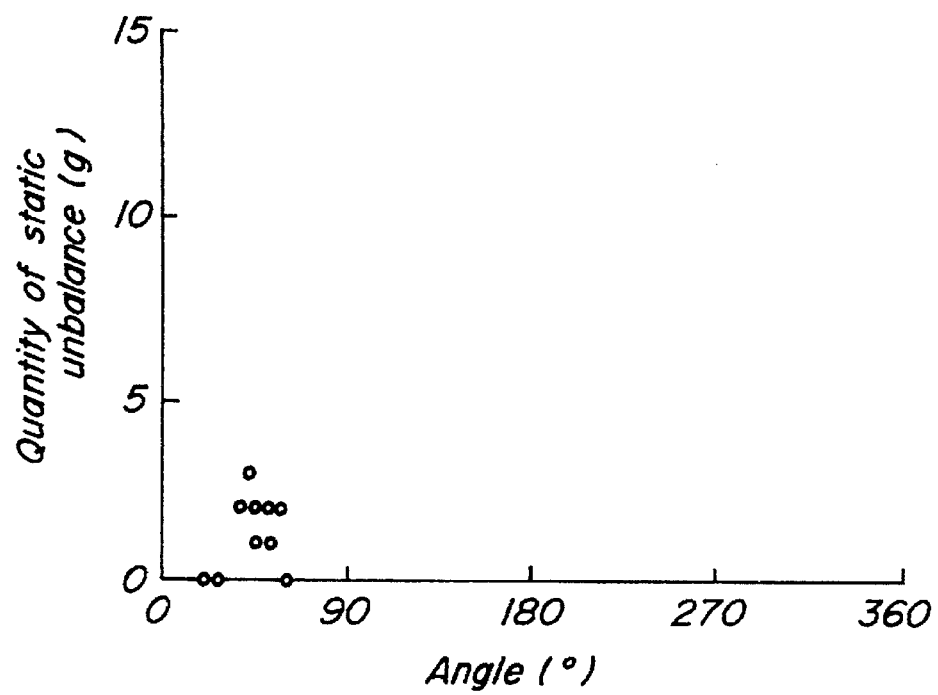
FIGS. 9a–9b are graphs showing a relation between quantity and angle of static unbalance.
Figure 9B:
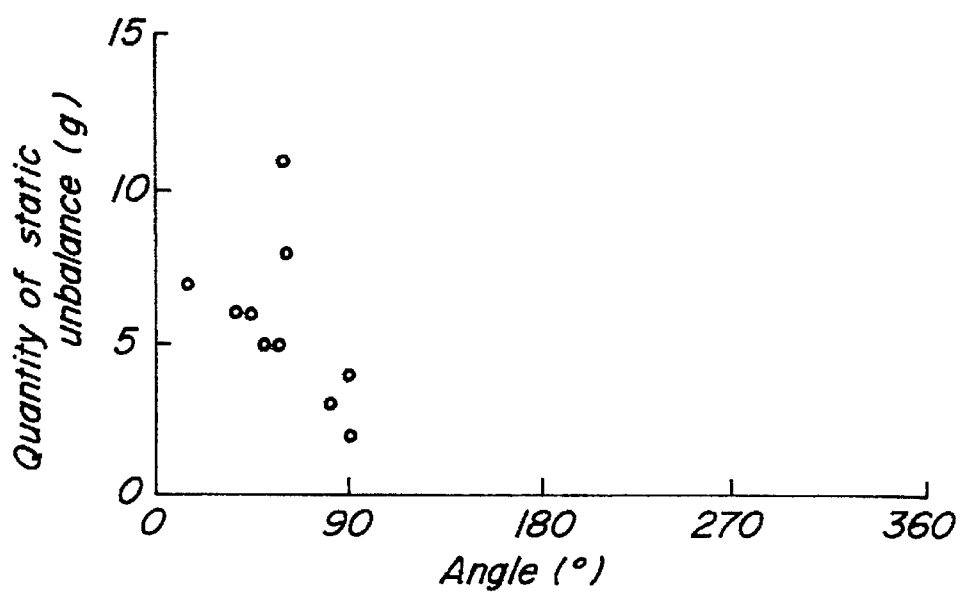

The measured values of static unbalance in Tables 1 and 2 are plotted in FIGS. 9a and 9b, while the measured values of residual dynamic unbalance in Tables 1 and 2 are plotted in FIGS. 10a and 10b. As seen from FIG. 9a, the static unbalance obtained by using the installing device according to the invention is 3 g (grams) at maximum and is small within a narrow angle range. While the static unbalance obtained by using the conventional installing device is 11 g (grams) at maximum and is scattered within wide ranges of the quantity and angle as seen from FIG. 9b. In FIG. 9a, the appearance of the angle at static unbalance quantity of 0 (three points) corresponds to numerical value obtained by vector calculation of the static unbalance. FIGS. 10a and 10b show residual dynamic unbalances obtained by using the installing device according to the invention and the conventional installing device, respectively, from which it is obvious that the measured value in the device according to the invention is 4 g (grams) at maximum and is gathered in the vicinity of the angle of 90°, while the measure values in the conventional device are dispersed over all angles.

As seen from the above, the installing device according to the invention is excellent in the reproducibility of unbalance measurement and can accurately conduct the correction of unbalance in the tire-wheel assembly.

What is claimed is:

1. A device for installing a tire-wheel assembly onto a wheel balancer comprising: a rotating shaft for the wheel balancer for rotating the tire-wheel assembly, a wheel receiving member concentrically fixed to the rotating shaft and having a disc-contacting portion and a cup-shaped base portion defining a cavity therein, a tapered cone of a frustoconical shape concentrically and slidably attached onto the rotating shaft in the vicinity of the wheel receiving member and fitted in a center hole of a disc portion of the tire-wheel assembly so as to completely housed in the cavity when the tire-wheel assembly is mounted onto the wheel receiving member and the mounting is completed, a spring disposed in said cavity between a bottom of the cup-shaped base portion and the bottom of the tapered cone for moving the tapered cone toward a free end of the rotating shaft, a wheel pushing member for moving the disc portion of the tire-wheel assembly toward the wheel receiving member, and a female screw member movably engaging with male threads formed on an outer surface of the rotating shaft over a given region from the free end thereof, in the disc-contacting portion of the wheel receiving member provided at a side facing the disc portion with a recess portion formed in a peripheral direction of the disc-contacting portion and an elastic member and a protruding member disposed in the recess portion, wherein the protruding member contacts the elastic member and retractably moves from an outer surface of the disc-contacting portion in an axial direction thereof to be completely housed in the recess portion after the completion of the mounting of a tire-wheel assembly.

2. A device according to claim 1, wherein said recess portion comprise a plurality of holes formed in the disc-contacting portion of the wheel receiving member at a given interval in the peripheral direction thereof and an elastic member and a protruding member are disposed in each of the holes.

3. A device according to claim 1, wherein said recess portion is an annular groove formed in the disc-contacting portion of the wheel receiving member in the peripheral direction thereof and said elastic member and an annular protruding member are disposed in the annular groove.

4. A device according to claim 1, wherein a sliding member for reducing friction in a radial direction is concentrically arranged between the tapered cone and the spring with respect to the rotating shaft.

5. A device according to claim 3, wherein said elastic member comprises a ring body formed from a rubbery elastic material having an internal cavity.

6. A device according to claim 3, wherein said elastic member comprises a ring body formed of an annular metal plate having regular circumferential undulations.

7. A device according to claim 3, wherein a plurality of protruding members are disposed in said annular groove.

8. A device according to claim 7, wherein a plurality of elastic members are disposed in said annular groove.

9. A device according to claim 3, wherein said elastic member comprises an annular O-ring formed from a rubbery elastic material.

* * * * *